Patented Aug. 7, 1945

2,381,338

UNITED STATES PATENT OFFICE 2,381,338

VINYL TRIMETHYL ACETATE AND SYNTHETIC RESINS MADE THEREFROM

William R. Cornthwaite, Niagara Falls, and Norman D. Scott, Sanborn, N. Y., assignors to E. I. du Pont de Nemours & Company, Wilmington, Del., a corporation of Delaware No Drawing. Application October 5, 1942, Serial No. 460,834

1 Claim. (Cl. 260—86)

This invention relates to synthetic resins and more particularly to polymers and copolymers of vinyl esters.

Polymers of vinyl acetate and other vinyl esters of organic acids are valuable thermoplastic materials. However, their uses are somewhat limited because of the relatively low temperatures at which they soften, and the readiness with which they are attacked by solvents and hydrolyzing agents.

An object of the present invention is to prepare a new vinyl ester and our invention includes a process for that purpose. A further object is to polymerize said new ester to produce novel vinyl resins having increased resistance to elevated temperatures, solvents and hydrolyzing conditions and other useful properties. Other objects will be apparent from the following description.

We have discovered that vinyl trimethylacetate may be polymerized to yield a resinous polymer having greater resistance to heat, solvents and hydrolyzing conditions than the polyvinyl esters of comparable molecular weight known heretofore. For example, whereas polymers of vinyl esters such as the acetate, propionate, n-valerate and the like soften at around 35° C. and lower, our vinyl trimethylacetate polymers do not soften below temperatures of 65 to 88° C. They also are more resistant to solvent action and to hydrolysis than the other polyvinyl esters.

Pure monomeric vinyl trimethylacetate

a new compound, is a colorless liquid boiling at 108.8 to 109° C. at 748.4 mm. of mercury pressure. It has a specific gravity of 0.873 and a refractive index of 1.4083. It may be made in accordance with our invention by reacting acetylene with trimethylacetic acid, according to the following reaction:

We carry out the reaction in the vapor phase at temperatures of about 180 to 260° C., using as catalyst an organic salt of one or more metals of second group of the periodic system selected from the group consisting of zinc, cadmium and mercury, supported on activated carbon. For example, the trimethylacetates, acetates, propionates and stearates of such metals may be used. We prefer to use a metal trimethylacetate as catalyst and have obtained the best results with activated carbon impregnated with zinc trimethylacetate. However, any organic acid salt of zinc, cadmium or mercury is suitable for our purpose.

We are aware that it is common practice to prepare vinyl esters, e. g., vinyl acetate, by reacting acetylene with organic acids in the vapor phase and that metal salts such as zinc, cadmium or mercury acetate on activated carbon have been used as catalysts in such processes. However, it was known that the highly substituted acetic acids are generally difficult to esterify. Also, whereas vinyl esters generally may be made in good yield by reacting acetylene with the acids in the liquid phase, trimethylacetic acid is substantially non-reactive with acetylene in the liquid phase. It was, therefore, not evident that appreciable yields of vinyl trimethylacetate could be secured by the vapor phase reaction. By the herein described process, however, we are able to obtain yields of vinyl trimethylacetate which are at least as high as those obtained in making vinyl acetate and other vinyl esters, i. e., yields as high as 98% of the acetylene and trimethylacetic acid reacted.

In practicing our invention, it is essential that activated carbon be used as the catalyst support. We have found that other common catalyst supports are not suitable to produce appreciable yield of the product. The reaction temperature may vary from 150 to 300° C.; temperatures around 250 to 280° C. generally give the best results. Preferably, an excess of acetylene is mixed with the trimethylacetate and the mixture preheated before entering the reactor. Generally, a preheating temperature of around 140₀ to 150° C. is suitable, but the preheating temperature, if desired, may approach close to the reaction temperature.

The product, vinyl trimethylacetate, which is recovered by condensing the vapors issuing from the reactor, may be purified by fractional distillation. This product is a new chemical compound, not heretofore known or described.

Vinyl trimethylacetate may be polymerized by the methods and catalysts conventionally utilized to polymerize vinyl esters and other vinyl compounds. For example, its polymerization may be catalyzed by various peroxygen compounds, organic and inorganic, such as hydrogen peroxide, benzyl peroxide, persulfates (e. g., ammonium persulfate), organic peracids (e. g. peracetic acid) benzoyl peroxide, lauryl peroxide and the like. Other known vinyl polymerization catalysts such as boron trifluoride, lead alkyls also are effective for our invention. The vinyl trimethyl acetate may be polymerized in solution, e. g., in methanol, acetone, etc. or in aqueous dispersions to produce polymerized emulsions or granular polymers. Also, it may be polymerized by merely adding a catalyst and heating in the absence of solvent or dispersion medium.

Vinyl trimethylacetate also may be copolymerized with other polymerizable or co-polymerizable organic compounds; for example, with other substances having the groups

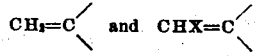

(where X represents a halogen), such as vinyl esters of organic and inorganic esters (including vinyl halides); vinyl ethers; vinyl ketones; vinyl aryls; acrylic and methacrylic acids and their esters, amides and nitriles; halogenated olefines, e. g. trichlorethylene, vinylidene chloride, chloroprene and the like and with other polymerizable olefinic and polyolefinic compounds.

Copolymers made by copolymerization of vinyl trimethylacetate with hydrolyzable vinyl esters may readily be hydrolyzed by conventional methods to yield novel partial esters of polyvinyl alcohol. For example, hydrolysis of the copolymer of vinyl acetate and vinyl trimethylacetate may be carried out to convert all or part of the acetate groups to hydroxyl groups, leaving the trimethylacetate groups substantially unchanged. By this method, the proportion of hydroxyl groups in the partially esterified polyvinyl alcohol can be accurately predetermined by copolymerizing the vinyl trimethylacetate with the required amount of vinyl acetate.

The following examples further illustrate our invention.

*Example 1*

About 5 gms. of vinyl trimethyl acetate were placed in a test tube and a grain of benzoyl peroxide added. It was then heated in a sand bath at 92° C. After ten minutes polymerization began and was allowed to continue overnight. A molded chip of the polymer was obtained by pressing at 150° C. and 15,000 lbs./sq. in for fifteen minutes. The molded chip contained a small amount of residual monomer but softened at 65-70° C.

*Example 2*

Fifty gms. of vinyl trimethylacetate were dispersed in 100 cc. of water containing 1.4 cc. of an 11.5% solution of partially saponified polyvinyl acetate. 0.025 gm. of benzoyl peroxide were added and the mixture kept refluxing until polymerization ceased (about 8 hours). Unpolymerized monomer was removed by steam distillation and the polymer filtered and washed with water. Yield—38 gms. After drying a molded chip of the polymer softened at about 64° C.

*Example 3*

One hundred and fifty gms. of vinyl trimethylacetate were dispersed in 150 cc. of water containing 1.4% of an 11.5% solution of partially saponified polyvinyl acetate. 0.1125 gm. (0.075% based on vinyl monomer) benzoyl peroxide were added and the mixture heated to reflux for 3½ hours. At this time an additional 0.0855 gm. of benzoyl peroxide were added and the mixture heated for one more hour. The polymer was filtered, washed, and dried. The yield was 136.7 gms. of solid resin. A molded chip softened at about 77° C. After extracting the resin with methanol a sample molding softened at about 87° C.

*Example 4*

29.8 grams vinyl chloride, 5.2 grams vinyl trimethylacetate, 0.215 gram ammonium persulfate, 5.28 grams of the sodium salt of a sulfonated petroleum oil hydrocarbon, and 75.5 grams of water were placed in a citrate bottle which was closed with a bottle cap containing a gasket made from polyethylene. Polymerization was carried out for 24 hours at 44-48° C. The contents of the bottle were heated to 80° C. and the polymer precipitated with 10% aluminum sulfate solution. The product is a granular white powder soluble in isobutyraldehyde, benzene and trichlorethylene and insoluble in methanol and ethyl ether. A sample was molded at 125° C. and 7,000 pounds pressure for five minutes. The molded chip softened at 72° C. and was extraordinarily tough.

*Example 5*

17.5 grams vinyl trimethylacetate, 17.5 grams methyl acrylate, 5.28 grams of the sodium salt of a sulfonated petroleum oil hydrocarbon, 0.215 gram ammonium persulfate, and 75 cc. of water were placed in a citrate bottle and sealed. The mixture was heated at 44-47° C. for 5½ hours and then allowed to stand overnight at 25° C. The emulsion was diluted with water, heated to 50° C. and the polymer precipitated as a white powder by the addition of 6 cc. of 10% aluminum sulfate, yield 98%. A sample of the polymer was molded at 140° C. under 7,000 pounds pressure in a two-inch mold for five minutes. The molded disc was flexible at room temperature and at 50° C. it was rubber-like, that is it had elastic properties. The polymer is soluble in isobutyraldehyde, benzene and trichlorethylene and swells in methanol and diethyl ether.

*Example 6*

A rubber-like soft transparent polymer was obtained in 87% yield using different proportions of monomers from that described in Example 5. The following quantities of ingredients were used: 5.2 grams vinyl trimethylacetate, 29.8 grams methyl acrylate, 0.28 gram benzoyl peroxide, 1 cc. 10% solution polyvinyl alcohol (Sap. No. 135), and 75.5 grams water.

*Example 7*

17.5 grams methyl methacrylate, 17.5 grams vinyl trimethylacetate, 0.215 gram ammonium persulfate, 5.28 grams of the sodium salt of a sulfonated petroleum oil hydrocarbon, and 75.5 grams water were charged into a citrate bottle and the contents heated at 45° C. for 5¼ hours after which it stood overnight at room temperature. The polymer was diluted with water, heated to 80° C. and precipitated with ammonium sulfate, yield 98.5%. The precipitated polymer was white and granular, soluble in benzene, isobutyraldehyde and trichlorethylene, insoluble in ethyl ether and swelled by methanol. A sample of the copolymer molded at 165° C. at 8,000 lbs. pressure for 10 minutes gave a transparent, slightly colored, brittle molding which did not soften at 85° C.

*Example 8*

3.84 grams vinyl trimethylacetate and 22 grams of methyl methacrylate were polymerized using the granular method. 1 cc. of polyvinyl alcohol 10% solution (Sap. No. 135) in 75 cc. of water was used as the granulating agent and 0.28 gram benzoyl peroxide as catalyst. About 24 hours were required for polymerization, the maximum temperature being 63° C. Yield of white granular powder was 96.7%. A sample of the copolymer was molded at 175° C. under 10 tons pressure. The molding was colorless, translucent, very hard and somewhat brittle. Its softening temperature was 109° C.

Example 9

A mixture of 17.5 grams vinyl cyanide and 17.5 grams vinyl trimethylacetate was polymerized as an emulsion in 75 cc. of water using 0.215 gram ammonium persulfate as catalyst and 5.28 grams of the sodium salt of a sulfonated petroleum oil hydrocarbon as emulsifying agent. The polymer was precipitated from the emulsion by the addition of ammonium sulfate, yield 84.8%. A sample of the copolymer molded at 175° C. and 5 tons pressure for 15 minutes yielded a slightly brown translucent product softening at 80° C. The copolymer swells in trichlorethylene and benzene but is not affected by ethyl ether, isobutyraldehyde or methanol.

Example 10

16 grams trichlorethylene, 16 grams vinyl trimethyl acetate and 0.353 gram benzoyl peroxide were placed in a flask fitted with a reflux condenser and heated at 80-90° C. for 89 hours. The copolymer was dried under vacuum at 80-90° C. for six hours, yield 69.4%. The product was pale yellow, very brittle and easily crushed to a white powder. The copolymer contains 31.37% chlorine by weight which corresponds to a copolymer having the composition 38.7% trichlorethylene and 61.3% vinyl trimethylacetate. The product melts at 85° C. and is soluble in benzene, trichlorethylene and isobutyraldehyde. It swells in methanol.

Example 11

26.25 grams vinylidene chloride, 8.75 grams vinyl trimethylacetate were polymerized with 75.5 grams of water using 0.215 gram ammonium persulfate as catalyst and 5.28 grams of the sodium salt of a sulfonated petroleum oil hydrocarbon as an emulsifier. Time of polymerization was 19¼ hours at 46° C. and 5 hours at 63° C. The copolymer was precipitated by the addition of 10% ammonium sulfate solution, yield quantitative. Molded chips of the copolymer were opaque and softened at room temperature. The product is swelled by hot benzene, hot trichlorethylene, and hot isobutyraldehyde, hot methanol has no effect.

Example 12

45 grams vinyl acetate and 5 grams vinyl trimethylacetate were polymerized by the granular method using 100 cc. of water, 0.05 gram benzoyl peroxide and 1.5 cc. of 11.5% solution of polyvinyl alcohol (Sap. No. 135). Five and one-half hours were required for polymerization and the yield was 97.75%. A molded chip of the copolymer softened at 41° C. and had a saponification number of 641 which indicates that the copolymer contains 5% of polyvinyl trimethylacetate.

Example 13

40 grams vinyl acetate and 10 grams vinyl trimethylacetate were polymerized in 100 cc. of water by the granular method using 0.05 gram benzoyl peroxide and 11.5% solution of polyvinyl alcohol (Sap. No. 135). Thirteen hours were required for the polymerization and the yield was 73%. A molded chip of the copolymer softened at 41° C. and had a saponification number of 606 (milligrams of KOH per grams of sample). The theory for a 20-80% copolymer is 611.6.

Example 14

35 grams of vinyl acetate and 15 grams of vinyl trimethylacetate were polymerized by the granular method as described previously, 78.4% yield. A molded chip of the copolymer softened at 43° C. and the product had a saponification number of 588, theory for a 30-70 copolymer is 588.5.

Example 15

The copolymers prepared in the three preceding examples were subjected to alcoholysis with methanol using a procedure established for the preparation of polyvinyl alcohol from polyvinyl acetate. It was calculated that the product obtained from the vinyl trimethylacetate 10-vinyl acetate 90 copolymer contained 18.6% vinyl trimethylacetate, that the vinyl trimethylacetate 20-vinyl acetate 80 contained 20.5% vinyl trimethylacetate and the product from the vinyl trimethylacetate 30-vinyl acetate 70 contained 26.7% vinyl trimethylacetate.

Example 16

Polymers of vinyl trimethylacetate are very resistant to hydrolysis as indicated by refluxing the polymer in a mixture of methanol, caustic and water for several days after which time the amount of hydrolysis was determined to be only 3.9% of the theory.

The hereinabove described polymers and copolymers of vinyl trimethylacetate may be mixed, compounded, blended or treated with various modifiers such as plasticizers, fillers, dyes, pigments, solvents and the like which are common to the art of making synthetic resins.

We claim:

A copolymer composed of trichlorethylene and vinyl trimethylacetate, said copolymer containing approximately 39% trichlorethylene and approximately 61% vinyl trimethylacetate.

WILLIAM R. CORNTHWAITE.
NORMAN D. SCOTT.